United States Patent [19]

Babu et al.

[11] Patent Number: 4,699,632
[45] Date of Patent: * Oct. 13, 1987

[54] PROCESS FOR GASIFICATION OF CELLULOSIC MATERIALS

[75] Inventors: Suresh P. Babu, Willow Springs; Gerald L. Anderson, Romeoville; Satyendra P. Nandi, Downers Grove, all of Ill.

[73] Assignee: Institute of Gas Technology, Chicago, Ill.

[*] Notice: The portion of the term of this patent subsequent to Jun. 3, 2003 has been disclaimed.

[21] Appl. No.: 865,056

[22] Filed: May 20, 1986

Related U.S. Application Data

[63] Continuation-in-part of Ser. No. 519,744, Aug. 2, 1983, Pat. No. 4,592,762, which is a continuation-in-part of Ser. No. 313,818, Oct. 22, 1981, abandoned.

[51] Int. Cl.$^4$ .............................................. C10J 3/54
[52] U.S. Cl. ..................................... 48/197 R; 48/203; 48/209; 252/373; 518/703
[58] Field of Search ...................... 48/197 R, 203, 209, 48/206, 111; 202/373; 518/703

[56] References Cited

U.S. PATENT DOCUMENTS

| | | | |
|---|---|---|---|
| 2,633,416 | 3/1953 | Gornowski et al. | 48/203 |
| 2,772,954 | 12/1956 | Jequier | 48/202 |
| 3,957,459 | 5/1976 | Mitchell et al. | 48/210 |
| 4,017,272 | 4/1977 | Anwer et al. | 48/210 |
| 4,157,245 | 6/1979 | Mitchell et al. | 48/197 R |
| 4,592,762 | 6/1986 | Babu | 48/209 |

Primary Examiner—Peter Kratz
Attorney, Agent, or Firm—Thomas W. Speckman; Ann W. Speckman

[57] ABSTRACT

A process for gasification of cellulosic materials in a single gasification vessel wherein the cellulosic materials are introduced directly into a single back-mixed fluidized bed of high heat capacity inert solids. The fluidized bed is maintained at temperatures of about 1200° to about 1600° F., pressures of up to about 500 psig devolatilizing the cellulosic materials. A substantial portion of the heavier hydrocarbons produced by devolatilization of the cellulosic materials is reformed within the gasification vessel and a substantial portion of the devolatilized cellulosic materials is gasified by reaction with hydrogen and steam within the fluidized bed. Cellulosic materials residue is combusted in an oxygen-rich atmosphere in the lower portion of the fluidized bed to principally form heat and cellulosic materials ash. The highly back-mixed fluidized bed results in temperature variation along the height of the bed, including the combustion zone, of less than 100° F. and preferably less than about 90° F. Introduction of cellulosic materials feed to the fluidized bed is vertically adjustable and maintained at a position where the combustion consumes principally cellulosic materials residue. Formed gases, vapor and biomass ash are removed from the top of the gasification vessel in the gas stream. The process provides high throughput, efficient production of low and medium Btu fuel gas. The medium Btu fuel gas may be readily upgraded to high Btu SNG. At least half of the methane required for SNG is produced in the gasification vessel.

35 Claims, 1 Drawing Figure

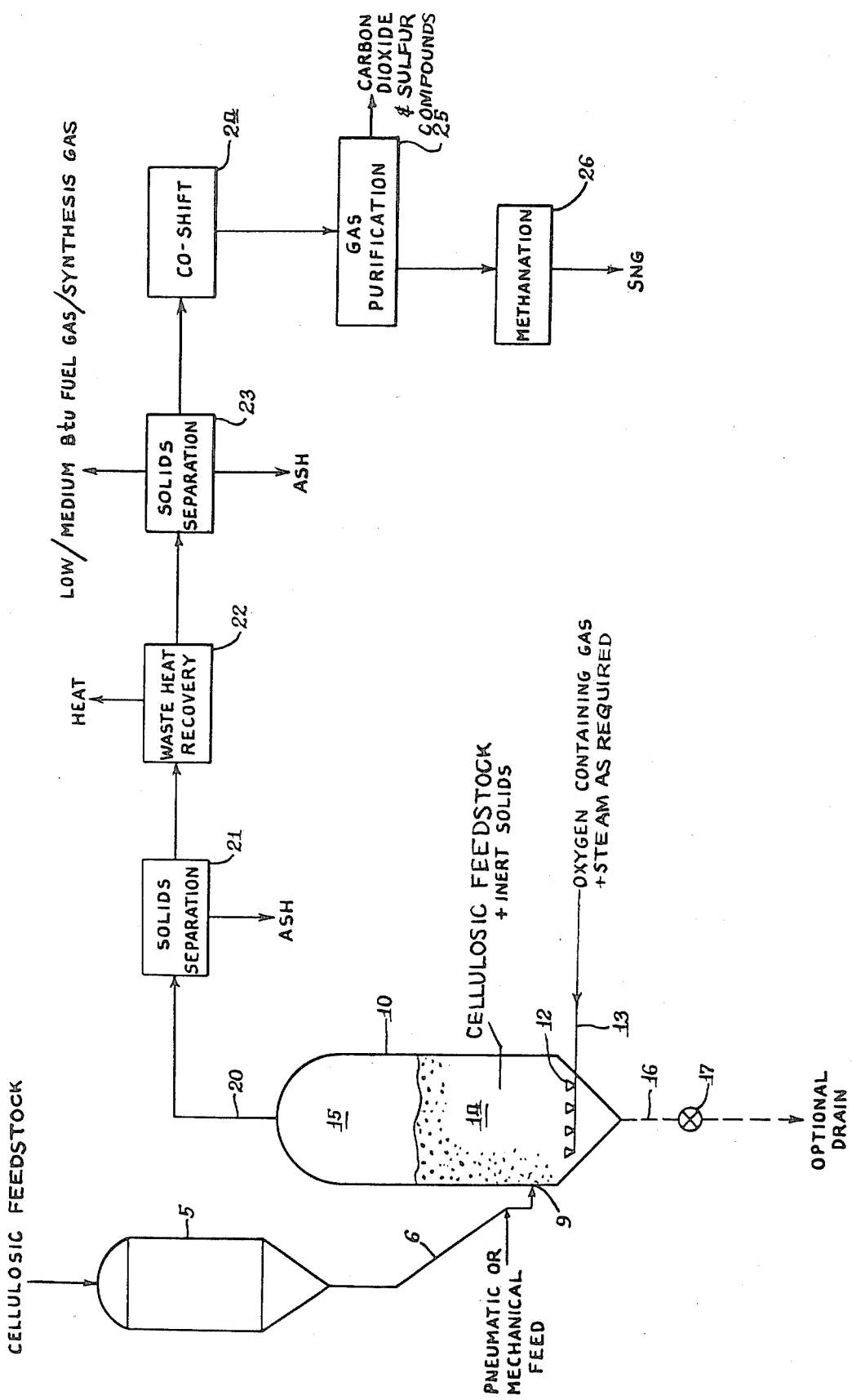

PROCESS FOR GASIFICATION OF CELLULOSIC MATERIALS

CROSS REFERENCE TO RELATED APPLICATIONS

This application is a continuation-in-part of co-pending application Ser. No. 519,744, filed Aug. 2, 1983, which was a continuation-in-part of application Ser. No. 313,818, filed Oct. 22, 1981, now abandoned.

BACKGROUND OF THE INVENTION

1. Field of the Invention

This invention relates to a process for gasification of cellulosic materials including biomass, such as plants, trees, and their wastes, and municipal solid waste and derived products in a single gasification vessel to produce low and medium Btu fuel gas, that is, gases varying in composition from those rich in CO, $H_2$, and $N_2$ to those rich in CO, $H_2$ and $CH_4$, respectively. The medium Btu fuel gas may be readily treated to form high Btu substitute natural gas, it can be processed as synthesis gas for methanol production, or may be directly used as an industrial fuel gas. Low Btu gas may be used for direct combustion. The fuel gases could be burnt in boilers to generate steam which in turn could be used to generate electricity. Alternatively, the pressurized fuel gases could be used in combined-cycle turbines to generate electricity at a higher efficiency. The process utilizes readily available and renewable energy resources which are converted by the process of this invention to clean and energy-intensive substitute fuel gases and for use as raw materials for desired chemicals or fuels.

2. Description of the Prior Art

Gasification of carbonaceous materials has been recognized in the past, as for example in U.S. Pat. No. 3,884,649 relating to coal gasification, U.S. Pat. Nos. 3,929,715, 3,891,403 relating to gasification of shale, and U.S. Pat. No. 4,263,125 relating to gasification of peat. Gasification of carbonaceous solids, such as coal and shale, is taught by Mitchell et al, U.S. Pat. No. 4,157,245 to be carried out in countercurrent plug flow of carbonaceous material and solid heat transfer material to impede vertical backmixing throughout the gasification zone, maintaining preferably a 500° to 2000° F. temperature difference in the vertical height of the gasifier. This process also requires a separate combustor vessel for heating the heat transfer material and requires complicated solids transport. The Gornowski et al, U.S. Pat. No. 2,633,416 teaches production of watergas mixtures of carbon monoxide and hydrogen and likewise involves countercurrent plug flow in two or more fluidized beds requiring solids transport. Franke et al, Federal Republic of Germany, Patent Publication 2741805 teaches control of the temperature profile along the axis of a reactor for gasification of solid fuels with oxygen-containing gas in a fluidized bed reactor by introduction of reactants at a number of locations along the height of the reactor, most of the fuel being fed to the headspace to fall onto the fluidized bed.

There have been several attempts to gasify biomass. Battelle Columbus Laboratory, Columbus, Ohio, has developed a process for gasifying forest residues based upon the Battelle multiple solid fluidized bed gasification process operating at temperatures up to about 1600° F. and atmospheric pressure. The process is described in Feldman, H. F., "Conversion of Forest Residues to Produce a Methane-Rich Gas", paper presented at the Twelfth Biomass Thermochemical Conversion Contractor's meeting, Washington, D.C., Mar. 18, 1981 and utilizes gasifiers similar to the process described in Burton, R. S., and Bailie, R.C., "Fluid Bed Pyrolysis of Solid Waste Materials", Combustion, 13–18 (1974) February, to pyrolyze a variety of biomass materials and animal wastes. The process uses two fluidized bed reactors making up a gasifier and a combustor, thereby requiring transport of solids between the two reactors.

Battelle Pacific Northwest Laboratory has developed a multiple catalytic gasification process for biomass utilizing catalysts, such as potassium carbonate and Ni-Co-Mo, to promote the steam-carbon and hydrocarbon reforming reactions as described in Mudge, L. K. et al, "Progress of Catalyzed Steam Gasification of Biomass", paper presented at the Twelfth Biomass Thermochemical Conversion Contractors meeting, Washington, D.C., Mar. 18, 1981. This process utilizes 1 to 2 percent by weight of catalyst, mixed with the raw biomass and requires a catalyst recovery step. The process employs a fluidized bed gasifier with the energy required for gasification supplied by superheated steam, external electrical heatup, or recycled preheated product gas.

Another gasification process of biomass has been conducted by Wright-Malta Corporation using a pressurized rotary kiln gasifier as described in Coffman, J. A., "Pressurized Steam Gasification of Biomass", paper presented at the Twelfth Biomass Thermochemical Conversion Contractors meeting, Washington, D.C., Mar. 18, 1981. This process utilizes alkaline earth metal catalysts to gasify biomass with steam to produce a medium Btu gas.

Another biomass gasification process has been carried out of the Garrett Energy Research and Engineering Co., Inc. involving pyrolysis and combustion of biomass in an atmospheric-pressure multiple-hearth reactor as described in Garrett, D., "Conversion of Biomass to Gaseous Products", paper presented at the Second Annual Fuels from Biomass Symposium, Troy, New York, June 20-22, 1978.

The applicants are also aware of fluidized bed biomass gasification being conducted at the University of Missouri, Texas Technical University and Saskatchewan Power Corporation, Regina, Saskatchewan, Canada, all using steam and air for low Btu gasification and the Omnifuel, Canada, fluidized bed oxygen blown gasification process operated at low pressures. Some of these processes utilize freeboard feeding and, in some cases, external heating is provided.

Biomass and solid wastes have also been used in gas production utilizing a fluidized bed pyrolysis system as described in Epstein, E., Kosstrin, H. and Alpert, J., "Potential Energy Production in Rural Communities from Biomass and Wastes using a Fluidized-Bed Pyrolysis System", Energy Resources Co., Inc., Cambridge, Massachusetts, paper presented at Symposium on Energy from Biomass and Wastes, IV, Washington, D.C., Aug. 14, 1978. The Epstein article teaches gas yields of up to about 50 to 60 percent from corncobs while yielding char in the order of 10 to 20 percent.

The extent of the prior work indicates a clear need for an effective single stage, noncatalytic, pressurized, fluidized bed gasification process wherein a large percentage of methane gas is produced directly from the biomass material while producing very low quantities of biomass ash so that the ash can be removed in the gas stream. A process which does not require external heating or require solids circulation between reactant stages is particularly desired.

SUMMARY OF THE INVENTION

The present invention provides a process for gasification of cellulosic materials including biomass and municipal solid wastes in a single gasification vessel obtaining high, approaching total, carbon conversion to useful gases. The process of this invention results in a high percentage of methane in the very rapid hydrodevolatilization of the cellulosic feed, such as trees, plants, and their wastes, and municipal solid wastes and cellulosic products derived therefrom.

The cellulosic material of about 5 to about 50 weight percent moisture is introduced into a fluidized bed of high heat capacity inert solids in a gasification vessel. The gasifier is maintained at temperatures of about 1200° to about 1600° F. and a pressure of up to about 500 psig, usually about 200 to about 500 psig. The fluidized bed has a hydrogen-containing gas region which results in rapid hydrodevolatilization of the introduced cellulosic material forming methane, heavier hydrocarbons, carbon oxides, steam, hydrogen and devolatilized cellulosic material. A substantial portion of heavy hydrocarbons produced are reformed into methane, carbon oxides, hydrogen and steam within the fluidized bed. A substantial portion of the devolatilized cellulosic material is gasified by reaction with steam and hydrogen within the fluidized bed producing methane, carbon oxides, hydrogen and cellulosic material residue. The cellulosic material residue is combusted in an oxygen-rich atmosphere together with some of the product gases in a combustion zone in the lower portion of the bed to principally form heat and cellulosic material ash. Oxygen-containing gas is introduced and distributed to the fluidized bed below the combustion zone to provide oxygen in an amount to be substantially used in the combustion zone. The produced gases, vapor and biomass ash are removed in the gas stream from the top of the gasification vessel.

The fluidized bed used in the process of this invention is highly backmixed to maintain little temperature variation throughout the height of the bed. Desired backmixing is obtained by adjustment of the superficial gas velocity in relation to the particle sizes and densities. Attainment of desired back-mixing is ascertained by measurement of the temperature profile throughout the height of the fluidized bed. It is suitable for the process of this invention that temperature differences of less than about 100° F., preferably less than about 90° F., and preferably less than about 50° F., be maintained throughout the fluidized bed, including the combustion zone and the upper portion of the bed, which indicates backmixed operation and also assures fast heat up of the feed material in a hydrogen-containing atmosphere.

We have found that using Balsam fir puckerbrush and Bermuda grass gasification conversion in excess of 95 percent may be obtained at short residence times, in the order of 3 to 5 minutes, at 1600° F. and 300 psig, and that about half of the total methane that can be produced in an SNG process is produced in the single stage gasifier. Similar results may be expected from the gasification of MSW or RDF.

It is an object of this invention to provide a process for non-catalytic, pressurized, gasification of cellulosic materials.

It is yet another object of this invention to provide a process for gasification of cellulosic materials which may be carried out in a single reactor thereby avoiding solids transport.

It is still another object of this invention to provide a process for gasification of cellulosic materials which forms a high percentage of methane directly in the single fluidized bed reactor.

It is yet another object of this invention to provide a process for gasification of cellulosic materials resulting in ash which may be removed with the off-gases.

It is another object of this invention to provide a process for gasification of cellulosic materials in a highly back-mixed fluidized bed wherein the temperature variation throughout the height of the bed is less than about 100° F. which is also illustrative of the back-mixed uniform raw gas composition in the portion of the bed above the combustion zone.

It is still another object of this invention to provide a process for gasification of cellulosic materials wherein most of the process steam requirements and a majority of the process heat requirements may be obtained within the reactor by combustion of high moisture content cellulosic feed material itself.

It is a still further object of this invention to provide a gasification process in which the cellulosic materials feed may be easily fed to the fluidized bed with a pneumatic or mechanical solids feeder.

It is another object of this invention to provide a cellulosic materials gasification process producing a high amount of methane from direct hydrogasification of the cellulosic materials by reaction with hydrogen in the surrounding gases and producing other gaseous materials which may be readily upgraded to produce SNG.

It is still another object of this invention to provide a cellulosic materials gasification process utilizing air as an oxygen containing gas producing low Btu fuel gas.

BRIEF DESCRIPTION OF THE DRAWING

Other objects and advantages of this invention will be apparent by reading of the further description of the preferred embodiments and by reference to the drawing setting forth a preferred embodiment wherein:

The FIGURE shows a schematic block diagram of the process of this invention for production of low/medium Btu fuel gas/synthesis gas and SNG.

DESCRIPTION OF PREFERRED EMBODIMENTS

The term "cellulosic materials" as used in this description and the appended claims includes biomass and its waste, municipal and industrial solid waste and derived products having cellulosic materials content in excess of 50 wt. percent. Cellulosic biomass includes plant material which may be of terrestial or aquatic origin, forestry wastes, plant wastes and the like. Mixtures of these materials may be used. Plant material may include any of the organisms of the kingdom of Plantae which typically have cell walls composed of cellulose in large part and have nutritive systems in which carbohydrates are formed photosynthetically. The plant material useful in the process of this invention is fresh harvested or stored plant material, which is usually grown on farms for this purpose, and is untreated chemically or physically, except for size reduction. Terrestial plants include warm season grasses, such as Bermuda grass and elephant grass; cool season grasses, such as Kentucky blue grass and Marion blue grass; reedy plants, such as bamboo, rice, cattails; herbaceous plants, such as Kudzu and maze; deciduous trees, such as Eucalyptus and Poplar; and coniferous trees, such as white and red pines. Exemplary aquatic plants include water hyacinth, duckweed, sea kelp and sargassum. Forestry wastes and agricultural wastes include portions of plants after some physical or chemical treatment, usually not including the entire plant, for example, straw, stumps from logging, sawdust, wood chips, corn stalks, corncobs and bagasse. Municipal and industrial solid wastes generally comprising cellulosic materials in excess of about 50 wt. percent are suitable for use in this invention. Municipal and industrial solid wastes having glass and metals separated by conventional techniques has a higher cellulosic content and is especially suitable for use in this invention. Such separated municipal and industrial solid wastes are known as Refuse Derived Fuel which may be advantageously used in pelletized form.

Suitable size for cellulosic feedstock for use in the process of this invention is such that its greatest dimension is less than about ¼ inch to about 1½ inches.

Fresh cut biomass may be chopped to an appropriate size and the moisture may be reduced by air drying and/or low level heat available from the gasification process. The desired extent of drying may result in the cellulosic biomass having preferably about 5 to about 50 weight percent moisture, dependent upon process conditions and availabilities of services. For example, when steam is unavailable at the site, sufficient process steam may be generated within the reactor by utilizing freshly harvested feed of cellulosic biomass and/or municipal and/or industrial solid wastes of about 40 to about 50 weight percent moisture. In such instances steam is generated within the reactor vessel and it may be necessary to supply additional oxygen to the reactor, beyond that required for drier feeds to provide additional heat from combustion to dry the feed within the reactor. Conversely, if steam is readily available at the site, it may be more desirable to dry the cellulosic feed to about 5 to about 25 weight percent moisture. The cellulosic feed material may be stored and fed to lockhopper 5 for feeding through conduit 6 to fluidized bed 14 within gasifier vessel 10. The feed material may be transported mechanically by screw feeding, extrusion, or pneumatically through a mechanical valve, such as an L-valve, into the fluidized bed 14. Pneumatic transport may be provided by steam, recycled product gas, carbon dioxide recovered from the gas purification step, and mixtures thereof. The feeding means controls the rate of cellulosic feed introduction into the fluidized bed.

Gasification vessel 10 may be any suitable shape and material as known to the art, such as a cylindrical steel reactor with refractory lining. Fluidized bed 14 is supported by the reactor vessel and contains one or more steam and steam/oxygen distributors or air distributors such as 12. Suitable distributors are known in the art.

The fluidized bed may be formed of high heat capacity, inert solids which are closely sized and provide an excellent heat transfer medium and back-mixing required to insure relatively uniform temperatures and adequate residence time for gasification of devolatilized cellulosic materials and combustion of cellulosic materials residue within the bed. Suitable inert solids for the fluidized bed used in this invention have mean particle diameters of about 0.06 to about 0.70 millimeters and preferably about 0.20 to about 0.60 millimeters. Fluidized beds of solid particles are known in the art for thermal transfer and a variety of materials are known to be suitable. It is desired that the solid particles be inert to reactants and products involved in the cellulosic materials gasification process of this invention. Solid particles of silica, alumina, mullite, and mixtures thereof, and other inert materials are suitable. Silica and alumina are preferred inert solids for use in the fluidized bed in the process of this invention. The extraneous mineral matter associated with the cellulosic feed materials, such as sand in forest wastes, may serve as inert solids for the fluidized bed, thereby obviating the requirement of washing or cleaning the cellulosic feed material. When gas flow through the bed reaches the threshold velocity for the specific particulate bed, dependent upon particle density, particle size and bed depth, the particulate bed expands and becomes fluidized. Conversely, the gas flow can reach a velocity above which the particles are carried from the bed. Suitable fluidization velocities can be readily ascertained by one skilled in the art. It is preferred that fluidization of fluidized bed 14 be provided by steam and/or oxygen containing gas introduced at the bottom of gasification chamber 10 through conduit 13 and distributor means 12. Fluidization may also be enhanced by the gas used in pneumatic introduction of cellulosic feed material to the gasification vessel. Fluidization of the fluidized bed 14 may be controlled by the rates of gaseous input to gasification chamber 10. With gaseous inputs above the minimum fluidization velocity and below the elutriation velocity, the solids are back-mixed in the bed. Thermal gradients along the bed height of less than about 100° F., preferably less than about 90° F., and most preferably less than about 50° F., shows good back-mixing as desired in the process of this invention. This is achieved by control of the cellulosic feed rate and superficial velocity of the fluidizing gas relative to the density and size distribution of the solids in the fluidized bed. The solids are well mixed throughout the back-mixed bed as shown by the relatively uniform thermal profile along the height of the bed, even with combustion within the lower portion of the bed. When raw cellulosic feed materials are introduced with inert solids, such as accompanying, unseparated mineral matter, the fluidized bed serves to separate the mineral matter from the cellulosic feed material and the excess mineral matter may be withdrawn.

The cellulosic material feed is introduced directly into the fluidized bed where temperatures are maintained at about 1200° to about 1600° F., pressure is maintained at about 200 to about 500 psig, and a hydrogen-rich atmosphere may be provided for hydrodevolatilizing the cellulosic material forming methane, heavier hydrocarbons, carbon oxides, steam, hydrogen and devolatilized cellulosic material. We have found that contrary to prior art teachings involving gasification of carbonaceous materials, such as shale, a slow heatup period is neither required nor desirable. We have found that introduction of the cellulosic material feed directly into the fluidized bed maintained at high temperatures to provide fast heat-up of the cellulosic material, results in up to 70 percent weight loss and, in a pressurized hydrogen-rich atmosphere to increase production of higher Btu gas, almost instantaneous thermal decomposition of the cellulosic material occurs followed by rapid gas phase hydrogenation of volatile products directly to methane. Reforming of a substantial portion of the heavy hydrocarbons formed into methane, carbon oxides and steam may occur both within the fluidized bed and in the head space 15 of the reactor above the fluidized bed. Reforming of the formed liquids is enhanced by back-mixing within the fluidized bed itself. For production of lower Btu gases, such as synthesis gas, it is not necessary to maintain the hydrogenrich atmosphere.

While suitable temperatures within the fluidized bed are about 1200° to about 1600° F., preferred operating temperatures are about 1500° to 1600° F. to provide high reaction rates with low residence time. It is also preferred that the pressure be maintained at about 300 to about 500 psig to favor hydrogenation in the upper portion of the reactor. Residence times of about ½ to 8 minutes provide high gasification conversion at the specified temperatures and pressures with preferred residence times of about 4 to 8 minutes.

The devolatilized cellulosic material is mixed throughout the fluidized bed and in a hydrogen-containing gaseous atmosphere about 15 percent of the carbon rapidly forms methane, producing additional methane. A substantial portion of the remainder of the devolatilized cellulosic material is gasified in a slower manner by reaction with steam to form carbon oxides, hydrogen and cellulosic material residue.

The reactor geometry can be varied by changing the distance between the cellulosic material introduction point and the oxygen/air distributor to combust primarily either devolatilized cellulosic material or the gases formed by the cellulosic material devolatilization. Combustion of the devolatilized cellulosic material results in higher methane product for medium or higher Btu gas product and combustion of the gases formed by devolatilization results in higher CO and $H_2$ synthesis gas product. The desired product gas composition may be determined by the ultimate use of the product gas and the economics of the overall process in production of desired products. The adjustments may be readily ascertained dependent upon the type and moisture content of the cellulosic material feed and the oxygen content and rate of flow of the oxygen-containing gas. Combustion is maintained in a combustion zone beneath the devolatilization zone. The combustion zone is maintained as an oxygen-rich atmosphere provided by oxygen-containing gas fed to the lower portion of the gasification vessel. The oxygen-containing gas may be pure oxygen, an inert carrier gas with oxygen, or air. The combustion of the cellulosic material residue principally forms heat and a small quantity of cellulosic material ash. The heat is directly transferred to the inert particles in the fluidized bed for high efficiency heat transfer throughout the bed and the low density biomass ash will become entrained in produced gases to leave gasification vessel 10 through conduit 20. The amount of oxygen introduced to the lower portion of the gasification vessel is an amount which is substantially less than stoichiometrically required for combustion of the cellulosic material residue or formed gases. This is necessary to obtain a desired hydrogen-containing gaseous atmosphere in the upper portion, or devolatilization and gasification zones of the fluidized bed. Partial combustion within the bed may preferably provide at least a major portion of the thermal energy required for the gasification reactions within the fluidized bed gasifier. In preferred embodiments, all of the thermal energy for the process may be supplied by combustion within the fluidized bed. Recycle of fuel gas may be used for additional combustion within the fluidized bed or for combustion external to the fluidized bed to provide thermal energy to the bed by heat exchange. External combustion of cellulosic material or any other combustible material may be used to supply thermal energy to the fluidized bed.

Drain conduit 16 with valve 17 is shown in the drawing for draining of non-elutriated ash or excess inert solids from the gasification vessel, should they accumulate. Most of the ash derived from the cellulosic material itself will be entrained in produced gases thereby avoiding problems of sintering or melting of ash encountered in systems which involve direct pyrolysis or combustion of the feed material itself. Another advantage of the present process over combustion processes is that in gasification the nitrogen present in materials such as wood converts to ammonia, as compared to forming nitrogen oxides upon burning, thereby providing an environmentally acceptable process. The use of cellulosic biomass materials is also environmentally desirable due to their very low sulfur content.

As shown in the drawing, the product gas is passed through any suitable solids separation device 21, such as a cylcone, to remove most of the suspended particulates. Sensible heat in the product gases may be recovered in waste heat recovery means 22 and may be used within the process for generating steam or drying the raw cellulosic feed materials. Remaining solids may be removed by a second solids separation means 23, such as by water scrubbing. The solids from both solids separation means may be pumped to biomass growth plantations in the form of a dense slurry and distributed as a nutrient-fertilizer or for disposal.

Low/medium Btu fuel gas may be withdrawn from the process from solids separation means 23 and used to supply heat within the process or removed from the process for use as fuel gas. Substitute natural gas (SNG) may be readily formed from the medium Btu fuel gas by passing the gas through a CO-shift means 24 where the ratio of $H_2/CO$ is adjusted to the desired level for subsequent methanation. The shifted gas may then be passed through a purification means 25 for removal of $CO_2$ and sulfur compounds by conventional acid gas scrubbing means and subjected to methanation in methanation means 26, such as catalytic methanation, and the product gas dried to produce SNG. All of the devices and processes downstream from gasification vessel 10 may include those well known to the art and do not by themselves form a part of this invention.

The medium Btu fuel gas may be readily processed to produce synthesis gas which may be further reacted to produce methanol, such as by reforming to CO and $H_2$ which may be catalytically reacted to form methanol. Suitable reforming and catalytic processes are known to the art.

The following specific examples are set forth for the purpose of illustration and should not limit this invention in any way.

EXAMPLE I

Balsam Fir Puckerbrush was found to have the following analysis:

|  | % by weight |
|---|---|
| Proximate Analysis |  |
| Moisture | 5.9 |
| Volatile Matter | 76.0 |
| Fixed Carbon | 17.4 |

-continued

|  | % by weight |
|---|---|
| Ash | 0.7 |
| Ultimate Analysis (Dry) | |
| Carbon | 51.60 |
| Hydrogen | 6.06 |
| Nitrogen | 0.14 |
| Sulfur | 0.01 |
| Oxygen (by diff) | 41.39 |
| Ash | 0.80 |

Based upon laboratory hydrodevolatilizing and thermobalance studies, on the basis of 100 pounds of Balsam Fir Puckerbrush fed to the fluid bed gasifier of a sand fluidized bed maintained at 1500° F. and 300 psig and biomass residence time of 3–5 min., the following raw gas could be produced and the following steam and oxygen feed would be necessary:

|  | lb Moles |
|---|---|
| Carbon Monoxide | 1.37 |
| Hydrogen | 1.63 |
| Steam | 1.89 |
| Carbon Dioxide | 1.56 |
| Methane | 0.42 |
| Ethane | 0.10 |
| Propane | 0.04 |
| Steam Feed | 1.54 |
| Oxygen Feed | 0.98 |

The overall carbon conversion is 95%

EXAMPLE II

Maple hardwood chips were found to have the following analysis:

|  | % by weight |
|---|---|
| Proximate Analysis | |
| Moisture | 5.5 |
| Volatile Matter | 81.2 |
| Fixed Carbon | 13.1 |
| Ash | 0.2 |
| Ultimate Analysis (Dry) | |
| Carbon | 49.8 |
| Hydrogen | 6.05 |
| Nitrogen | 0.15 |
| Sulfur | 0.00 |
| Oxygen (by diff) | 43.79 |
| Ash | 0.21 |

Based upon laboratory hydrodevolatilizing and thermobalance studies, on the basis of 100 pounds of Maple hardwood chips fed to the fluid bed gasifier of a sand fluidized bed maintained at 1500° F. and 300 psig and biomass residence time of 3–5 min., the following raw gas could be produced and the following steam and oxygen feed would be necessary:

|  | lb Moles |
|---|---|
| Carbon Monoxide | 0.71 |
| Hydrogen | 0.74 |
| Steam | 1.69 |
| Carbon Dioxide | 1.57 |
| Methane | 0.89 |
| Ethane | 0.19 |
| Propane | 0.00 |
| Steam Feed | 1.5 |
| Oxygen Feed | 0.52 |

The overall carbon conversion is 95%.

EXAMPLE III

A sand fluidized bed was maintained in a reaction vessel as shown in the FIGURE at a fluidized height of about 90 to 100 inches and diameter of 12 inches. Thermocouples were placed at 12 inch intervals along the height of the fluidized bed commencing 6 inches above the distributor and temperatures were recorded. The sand bed of mean particle size of 0.63 mm was maintained fluidized by introduction of steam and oxygen containing gas through distributors in an amount of 514 lbs. steam at about 750° F. and 44 lbs. oxygen. Maple wood chips sized at about minus ¼ inch were introduced directly into the fluidized bed. Almost all of the necessary process heat was thereafter provided by combustion within the fluidized bed except for a small fraction introduced as sensible heat in steam. During feed flow for one hour the bed temperature rose to an average of about 1530° F. and the temperature throughout the height of the fluidized bed as measured by the thermocouples described above varied by less than 40° F. Such a uniform temperature profile exhibits the desired high backmixing characteristics of the fluidized bed which ensure a fairly uniform gas composition throughout the bed above the combustion zone. The raw gas composition was determined to be: $CO=22.6\%$; $CO_2=23.6\%$; $H_2=41.0\%$; $CH_4=10.8\%$, $C_2H_6=1.0\%$; $C_2H_4=1.0\%$.

By contrast, temperatures encountered in fixed bed coal gasification processes vary greatly throughout the height of the bed with internal combustion. This is exemplified by the Lurgi Process, The Route to S.N.G. from Coal, Proceedings of Fourth Synthetic Pipeline Gas Symposium, Chicago, Ill., Oct. 30–31, 1972, pg. 175. The great temperature variance along the height of the fixed bed through the gasification zone wherein coal feed is added to the top of the bed and combustion takes place at the bottom of the bed is more than about 1800° F. in the bed (pg. 184).

The process of this invention provides a high throughput process, 400 to 1250 lbs/ft$^2$ hr or more for a bed having an L/D ratio of 2 to 6, for gasification of readily renewable resources of cellulosic material feedstock in a single gasification vessel to provide high methane content gas. These throughput rates are significantly greater than, up to about five times, the flow rates for commercial low pressure and fixed bed gasifiers. Gasification conversions in excess of 95 percent may be obtained at residence times of less than about 5 minutes. About one-half of the total methane required for the SNG production may be produced within the gasifier. The high methane yield is another novel feature of this process compared to the commercial low pressure and fixed bed gasifiers. The process of this invention may be operated to produce a very low quantity of hydrocarbon liquids which are relatively more difficult to utilize for energy producing purposes than the hydrocarbon gas produced which may be directly utilized for energy production. The process of this invention is attractive from practical standpoints since it will accept relatively wet feed materials and relatively coarse feed materials, such as directly accepting pulp wood size chips or sized forest residues or solid wastes without the necessity of pretreatment such as washing and separation of inorganic materials or drying. Due to these additional features of the pressurized oxygen-blown fluidized bed gasification process, it is considered superior to the commercial low pressure fluidized and fixed bed gasification processes.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for gasification of cellulosic materials in a single gasification and combustion vessel comprising the steps:
   introducing cellulosic materials feed of up to about 50 weight percent moisture directly into a single, highly back-mixed fluidized bed of high heat capacity inert solids in said vessel;
   maintaining said fluidized bed at temperatures of about 1200° to about 1600° F., said highly back-mixed fluidized state maintaining the temperature variation throughout the height of said fluidized bed at less than about 90° F., at a pressure of up to about 500 psig, devolatilizing said cellulosic materials in hydrogen-rich atmosphere in an upper portion of said bed forming methane, heavier hydrocarbons, carbon oxides, steam, hydrogen and devolatilized cellulosic materials;
   reforming a substantial portion of said heavy hydrocarbons into methane, carbon oxides and steam within said fluidized bed and in the head space of said vessel;
   mixing said devolatilized cellulosic materials throughout said fluidized bed and gasifying a substantial portion of said devolatilized cellulosic materials by reaction with hydrogen and steam within said upper portion of said bed producing methane, carbon oxides, hydrogen and cellulosic materials residue;
   combusting said cellulosic materials residue in an oxygen-rich atmosphere in a combustion zone in a lower portion of said bed to principally form heat and cellulosic materials ash, said heat being directly transferred to said inert solids in said single fluidized bed to maintain said fluidized bed temperatures;
   introducing and distributing oxygen containing gas to said bed below said combustion zone to maintain said oxygen-rich atmosphere, said oxygen introduced in an amount which is substantially less than stoichiometrically required for combustion of said cellulosic materials residue, so that said oxygen containing gas is substantially consumed in said combustion zone;
   removing formed gases, vapor and substantially all of said cellulosic materials ash in a gas stream from the top of said gasification vessel; and
   maintaining said introduction of cellulosic materials to said bed at a point where said combustion consumes principally cellulosic materials residue.

2. The process of claim 1 wherein said cellulosic materials feed is selected from the group consisting of biomass, municipal solid wastes, industrial solid wastes, and mixtures thereof.

3. The process of claim 1 wherein said cellulosic materials feed is principally cellulosic biomass.

4. The process of claim 1 wherein said cellulosic materials feed is principally municipal solid waste.

5. The process of claim 1 wherein said cellulosic materials feed is principally refuse derived fuel.

6. The process of claim 1 wherein said pressure is maintained at about 200 to about 500 psig.

7. The process of claim 1 wherein said cellulosic material introduced to said fluidized bed has about 5 to about 50 weight percent moisture.

8. The process of claim 1 wherein said fluidized bed is maintained at temperatures of about 1500° to 1600° F. and the residence time of said cellulosic materials in said vessel is about ½ to about 8 minutes.

9. The process of claim 8 wherein said pressure is about 300 to about 500 psig.

10. The process of claim 1 wherein all heat necessary to provide said temperatures is provided by combustion in said combustion zone.

11. The process of claim 1 wherein steam is additionally introduced and distributed to said fluidized bed.

12. The process of claim 11 wherein said cellulosic materials introduced into said reactor has a moisture content of about 5 to about 25 weight percent.

13. The process of claim 1 wherein said cellulosic materials introduced into said reactor has a moisture content of about 40 to about 50 weight percent and provides all steam for said gasification.

14. The process of claim 1 wherein said cellulosic materials feed comprises plant material selected from the group consisting of terrestial, aquatic and mixtures thereof.

15. The process of claim 1 wherein said cellulosic materials feed comprises particles having their greatest dimension less than about ¼ to about 1½ inches.

16. The process of claim 1 wherein said cellulosic materials feed is introduced into said fluidized bed by pneumatic transport provided by gas selected from the group consisting of steam, recycled product gas, carbon dioxide recovered from product gas, and mixtures thereof.

17. The process of claim 1 wherein said inert solids are selected from the group consisting of silica, alumina, mullite, and mixtures thereof and have mean particle diameters of about 0.06 to about 0.70 millimeters.

18. The process of claim 1 wherein the residence time of said cellulosic materials withing said vessel is about 4 to about 8 minutes.

19. The process of claim 1 wherein said cellulosic material feed is principally selected from the group consisting of municipal solid waste and refuse derived fuel.

20. The process of claim 1 wherein said temperature variation throughout the height of said fluidized bed is maintained at less than about 50° F.

21. The process of claim 20 wherein said cellulosic materials feed is principally selected from the group consisting of municipal solid waste and refuse derived fuel.

22. In a process for high methane content gas production, the improvement comprising gasification of cellulosic materials feed in a single gasification and combustion vessel comprising the steps:
   introducing cellulosic materials feed of up to about 50 weight percent moisture directly into a single highly back-mixed fluidized bed of high heat capacity inert solids in said vessel;
   maintaining said fluidized bed at temperatures of about 1200° to about 1600° F., said highly back-mixed fluidized state maintaining the temperature variation throughout the height of said fluidized bed at less than about 90° F., at a pressure of up to about 500 psig, and providing a hydrogen-containing gaseous atmosphere in a portion of said bed above a combustion zone for hydrodevolatilizing said cellulosic materials converting it to methane, heavier hydrocarbons, carbon oxides, steam, hydrogen and devolatilized cellulosic materials;

reforming a substantial portion of said heavy hydrocarbons into methane, carbon oxides and steam within said fluidized bed and in the head space of said vessel;

mixing said devolatilized cellulosic materials throughout said fluidized bed and gasifying a substantial portion of said devolatilized cellulosic materials by reaction with hydrogen and steam producing methane, carbon oxides, hydrogen and cellulosic materials residue;

combusting said cellulosic materials residue in an oxygen-rich atmosphere in a combustion zone in a lower portion of said bed to principally form heat and cellulosic materials ash, said heat being directly transferred to said inert solids in said single bed to maintain said fluidized bed temperatures;

introducing and distributing oxygen containing gas to said combustion zone to maintain said oxygen-rich atmosphere, said oxygen introduced in an amount which is sutstantially less than stoichiometrically required for combustion of said cellulosic materials residue, so that said oxygen containing gas is substantially consumed in said combustion zone;

removing formed gases, vapor and substantially all of said cellulosic materials ash in a gas stream from the top of said gasification vessel; and maintaining said introduction of cellulosic materials to said bed at a point where said combustion consumes principally cellulosic materials residue.

23. The process of claim 22 wherein said pressure is maintained at about 200 to about 500 psig.

24. The process of claim 22 wherein said cellulosic materials introduced to said fluidized bed has about 5 to about 50 weight percent moisture.

25. The process of claim 22 wherein said fluidized bed is maintained at temperatures of about 1500° to 1600° F. and the residence time of said cellulosic materials in said vessel is about ½ to about 8 minutes.

26. The process of claim 25 wherein said pressure is about 300 to about 500 psig.

27. The process of claim 22 wherein all heat necessary to provide said temperatures is provided by combustion in said combustion zone.

28. The process of claim 22 wherein said cellulosic materials feed introduced into said reactor has a moisture content of about 40 to about 50 weight percent and provides steam for said gasification.

29. The process of claim 22 wherein said cellulosic materials feed comprises particles having their greatest dimension less than about ¼ to about 1½ inches.

30. The process of claim 22 wherein said cellulosic materials feed is selected from the group consisting of biomass, municipal solid wastes, industrial solid wastes, and mixtures thereof.

31. The process of claim 22 wherein said cellulosic materials feed is princiaplly cellulosic biomass.

32. The process of claim 22 wherein said cellulosic materials feed is principally municipal solid waste.

33. The process of claim 22 wherein said cellulosic materials feed is principally refuse derived fuel.

34. The process of claim 22 wherein said cellulosic materials feed is principally selected from the group consisting of municipal solid waste and refuse derived fuel.

35. In a process for methanol production, the improvement comprising gasification of cellulosic materials in a single gasification and combustion vessel comprising the steps:

introducing cellulosic materials feed of up to about 50 weight percent moisture directly into a single, highly back-mixed fluidized bed of high heat capacity inert solids in said vessel;

maintaining said fluidized bed at temperatures of about 1200° to about 1600° F., said highly back-mixed fluidized state maintaining the temperature variation throughout the height of said fluidized bed at less than about 90° F., a pressure of up to about 500 psig, devolatilizing said cellulosic materials in a portion of said bed above a combustion zone forming methane, heavier hydrocarbons, carbon oxides, steam, hydrogen and devolatilized cellulosic materials;

reforming a substantial portion of said heavy hydrocarbons into methane, carbon oxides and steam within said fluidized bed and in the head space of said vessel;

mixing said devolatilized cellulosic materials throughout said fluidized bed and gasifying a substantial portion of said devolatilized cellulosic materials by reaction with hydrogen and steam within said portion of said bed above said combustion zone producing methane, carbon oxides, hydrogen and cellulosic materials residue;

combusting said cellulosic materials residue in an oxygen-rich atmosphere in a combustion zone in a lower portion of said bed to principally form heat and cellulosic materials ash, said heat being directly transferred to said inert solids in said single bed to maintain said fluidized bed temperatures;

introducing and distributing oxygen containing gas to said combustion zone to maintain said oxygen-rich atmosphere, said oxygen introduced in an amount which is substantially less than stoichiometrically required for combustion of said cellulosic materials residue, so that said oxygen containing gas is substantially consumed in said combustion zone;

removing formed gases, vapor and substantially all of said cellulosic materials ash in a gas stream from the top of said gasification vessel; and maintaining said introduction of cellulosic materials to said bed at a point where said combustion consumes principally cellulosic materials residue; and reforming said formed gases to CO and $H_2$ and catalytically reacting said CO and $H_2$ to produce said methanol.

* * * * *